(12) United States Patent
Radivojevic et al.

(10) Patent No.: US 8,766,784 B2
(45) Date of Patent: Jul. 1, 2014

(54) HAPTIC COMMUNICATION

(75) Inventors: Zoran Radivojevic, Cambridge (GB); Piers Andrew, Cambridge (GB); Jarkko Saunamäki, Vantaa (FI); Teppo Jokinen, Espoo (FI)

(73) Assignee: Nokia Corporation, Espoo (FI)

( * ) Notice: Subject to any disclaimer, the term of this patent is extended or adjusted under 35 U.S.C. 154(b) by 253 days.

(21) Appl. No.: 13/231,697

(22) Filed: Sep. 13, 2011

(65) Prior Publication Data

US 2012/0062371 A1 Mar. 15, 2012

Related U.S. Application Data

(60) Provisional application No. 61/382,373, filed on Sep. 13, 2010.

(51) Int. Cl.
| | | |
|---|---|---|
| *H04B 3/36* | (2006.01) | |
| *G08B 6/00* | (2006.01) | |
| *G06F 3/01* | (2006.01) | |
| *G09B 21/00* | (2006.01) | |

(52) U.S. Cl.
CPC *G08B 6/00* (2013.01); *G06F 3/016* (2013.01); *G09B 21/003* (2013.01)
USPC ........................................ 340/407.1; 340/500

(58) Field of Classification Search
CPC .......... G08B 6/00; G06F 3/016; G09B 21/003
USPC .................................................... 340/407.1
See application file for complete search history.

(56) References Cited

U.S. PATENT DOCUMENTS

| | | | | |
|---|---|---|---|---|
| 4,678,616 | A | * | 7/1987 | Kawashima ................... 264/429 |
| 5,532,681 | A | | 7/1996 | Peters et al. |
| 5,867,796 | A | * | 2/1999 | Inutsuka ........................ 455/567 |
| 6,240,176 | B1 | * | 5/2001 | Lygas ....................... 379/374.03 |
| 6,263,218 | B1 | * | 7/2001 | Kita ............................... 455/567 |
| 6,937,011 | B2 | * | 8/2005 | Engdahl et al. ............... 324/233 |
| 7,421,286 | B1 | * | 9/2008 | Sisto ............................. 455/557 |
| 7,962,224 | B1 | | 6/2011 | Blischak |
| 2002/0115478 | A1 | * | 8/2002 | Fujisawa et al. .............. 455/567 |
| 2005/0272408 | A1 | * | 12/2005 | Wilkes-Gibbs et al. ... 455/412.2 |
| 2007/0282378 | A1 | | 12/2007 | Huang et al. |
| 2010/0188327 | A1 | * | 7/2010 | Frid et al. ...................... 345/156 |

FOREIGN PATENT DOCUMENTS

| | | |
|---|---|---|
| DE | 4436974 A1 | 4/1996 |
| DE | 202009009505 U1 | 9/2009 |
| DE | 102010011120 A1 | 9/2011 |
| EP | 1014323 A2 | 6/2000 |
| JP | 2004199522 A | 7/2004 |

(Continued)

OTHER PUBLICATIONS

Norton, Quinn, "A Sixth Sense for a Wired World", Jun. 7, 2006, Wired, p. 1.*

(Continued)

*Primary Examiner* — Kerri McNally
(74) *Attorney, Agent, or Firm* — Harrington & Smith

(57) ABSTRACT

In accordance with an example embodiment of the present invention, an apparatus comprises: a material attachable to skin, the material capable of detecting a magnetic field and transferring a perceivable stimulus to the skin, wherein the perceivable stimulus relates to the magnetic field.

17 Claims, 5 Drawing Sheets

(56) References Cited

FOREIGN PATENT DOCUMENTS

| | | | |
|---|---|---|---|
| JP | 2005338031 | A | 12/2005 |
| WO | 2005040989 | A2 | 5/2005 |
| WO | 2011070554 | A2 | 6/2011 |

OTHER PUBLICATIONS

International Search Report and Written Opinion, received in corresponding Patent Cooperation Treaty Application No. PCT/FI2011/050702, dated Jan. 2, 2012, 5 pages.

* cited by examiner

HAPTIC COMMUNICATION

RELATED APPLICATIONS

This patent application claims priority from U.S. provisional patent application 61/382,373 filed on Sep. 13, 2010, which is hereby incorporated by reference in its entirety.

TECHNICAL FIELD

The present application relates generally to haptic communication between a user and an electronic device.

BACKGROUND

Haptic technology is a tactile feedback technology that takes advantage of a user's sense of touch by applying forces, vibrations, and/or motions to the user. Tactile feedback between a user and an electronic device may be provided by mechanical vibrations and/or pulses originating from all or part of an entire electronic device. Tactile feedback may be provided for example on a display.

SUMMARY

Various aspects of examples of the invention are set out in the claims.

According to a first aspect of the present invention, an apparatus comprises a material attachable to skin, the material capable of detecting a magnetic field and transferring a perceivable stimulus to the skin, wherein the perceivable stimulus relates to the magnetic field.

According to a second aspect of the present invention, an electronic device configured to generate a magnetic field, the magnetic field having at least one characteristic related to digital content stored on the electronic device.

According to a third aspect of the present invention, a method comprises detecting a magnetic field using a material attached to skin and causing a perceivable stimulus to the skin by magnetically manipulating the material.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 5 of the drawings.

Figure 1:
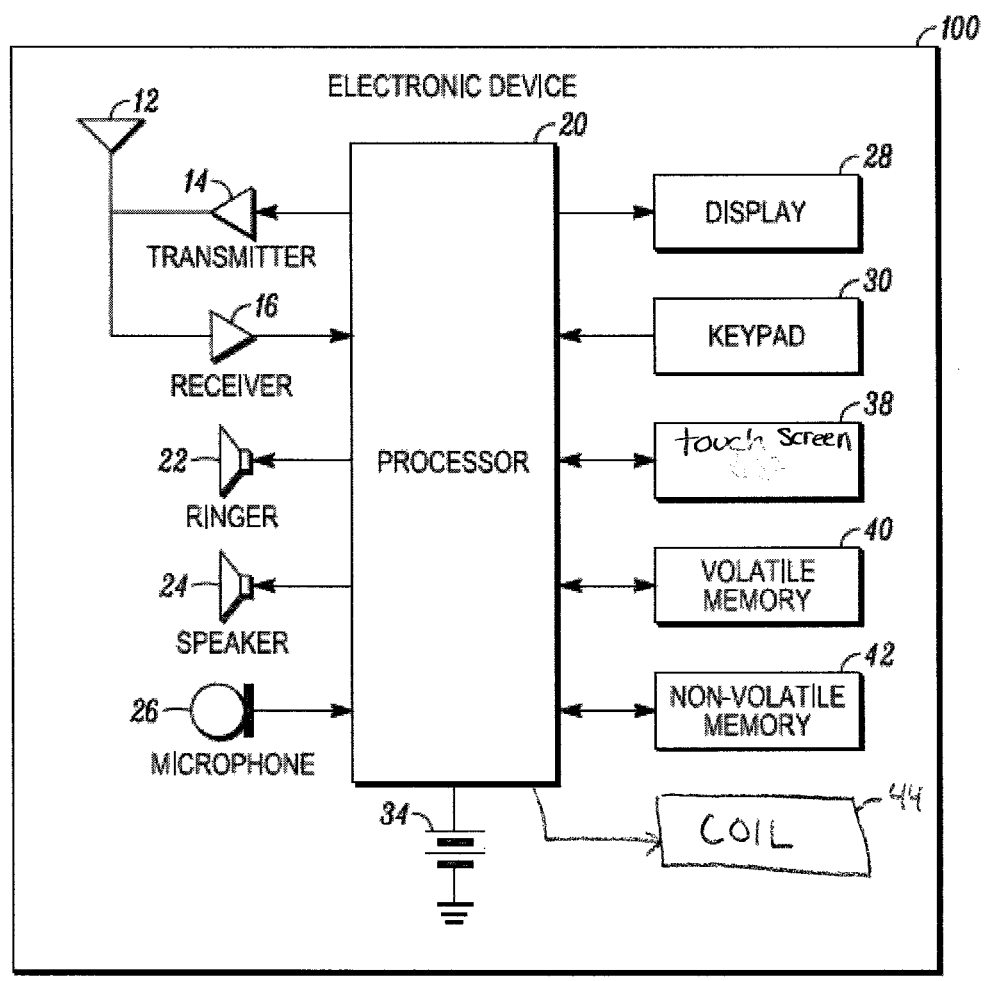
FIG. 1 is a diagram of an electronic device according to an example embodiment of the invention.
Figure 2:
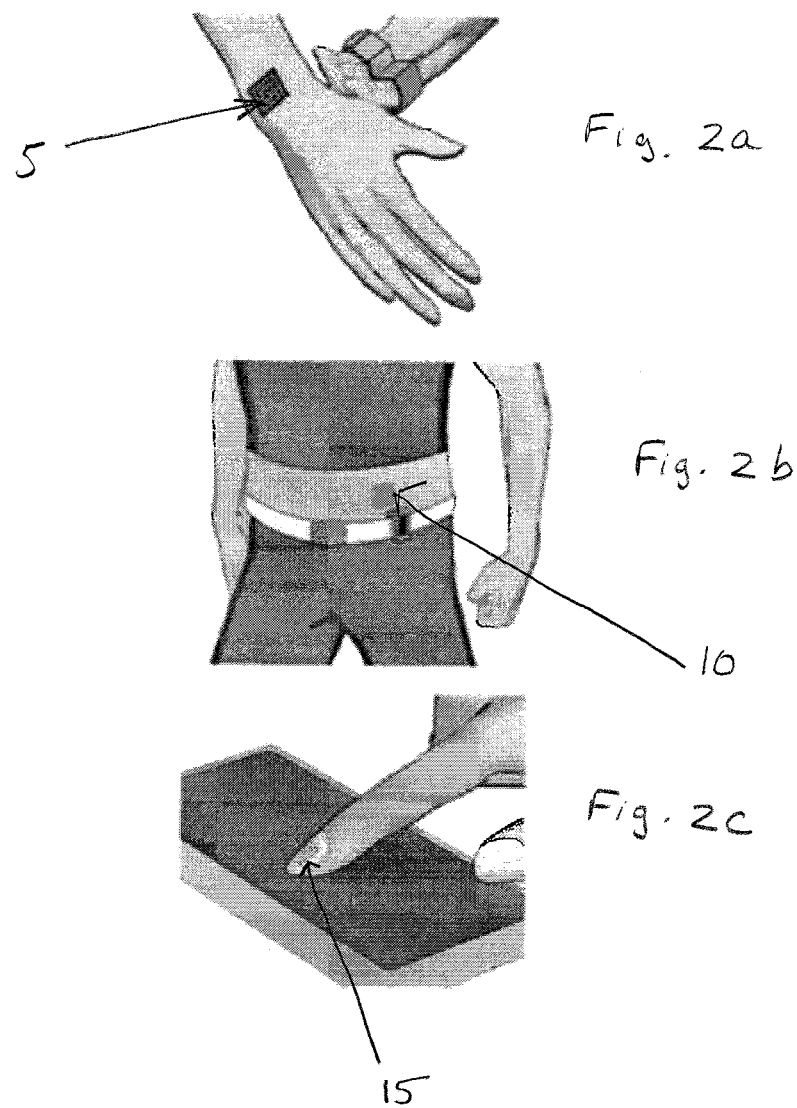
FIG. 2a is a diagram of an apparatus attached to a user's arm according to an example embodiment of the invention.
FIG. 2b is a diagram of an apparatus attached to a user's abdominal area according to an example embodiment of the invention.
FIG. 2c is a diagram of an apparatus attached to a user's fingernail according to an example embodiment of the invention.

FIG. 1 is a diagram of an electronic device 100 according to an example embodiment of the invention. In an embodiment, electronic device 100 comprises a display 28 as at least a portion of a user interface. The display 28 may be configured to show information about functionality of the electronic device to a user. The electronic device 100 may comprise an input element, such as keypad 30. The input element may be any type of input element including but not limited to a mechanical keypad, touch keypad, a key, and/or the like, configured to receive user input.

Electronic device 100 further comprises a power source 34, for example, a battery, which may be configured to provide power to the electronic device. Electronic device 100 may further comprise a transceiver which may comprise for example an antenna 12, transmitter 14 and/or receiver 16, configured to transmit and receive e.g. radio frequency (RF) signals to/from an external network and/or device. The electronic device 100 may comprise volatile memory 40 and/or non-volatile memory 42 configured to store information. Electronic device 100 may further comprise a processor 20, which may be configured to process information. The processor 20 may execute instructions and at least partly control internal data, operations and/or functions of the electronic device 100. In an embodiment, electronic device comprises a touch pad 38, a speaker 24, ringer 22, microphone 26, keypad 30 and/or the like. Speaker 24 may be configured to convert audio signals into sound. Microphone 26 may be configured to receive pressure waves of sound and convert the pressure waves into electrical signals. A touch pad 38 may be configured to receive touch input from a user. In an example embodiment, electronic device 100 further comprises a coil 44, which may be configured to generate a magnetic field.

Electronic device 100 may include but is not limited to a mobile phone, a laptop computer, a music player, an internet tablet, a personal digital assistant, a wrist warn electronic device, a neck warn electronic device, a game console and/or the like.

According to an embodiment, electronic device 100 is configured to generate a magnetic field; the magnetic field having at least one characteristic related to digital content stored on the electronic device 100. The magnetic field may comprise characteristics which are dependent on the digital content of the electronic device. In an embodiment, at least one characteristic of the magnetic field is controllable by the electronic device 100. The magnetic field may cause a perceivable stimulus. In an embodiment, perceivable stimulus may relate to the digital content of the electronic device 100. The perceivable stimulus may comprise at least one of different vibration frequencies and intensities and sequences of localized magnetic vibrations dependent on the digital content.

According to an example embodiment, electronic device 100 may comprise at least one coil 44 and/or an array of coils capable of causing an electromagnetic field. According to an example embodiment, an array of electromagnetic coils and/or plurality of electromagnetic coils may be configured to provide a magnetic vibrating pattern.

According to an example embodiment, an electronic device 100 comprises digital content, wherein said digital content may be at least one of the following: an alert of a message and incoming call, an alert of a body part in proximity of the electronic device 100, an alert of information shown in the electronic device, an alert of an application launch, a portion of image shown on display placed on top of magnetic surface and/or the like.

In an embodiment, the magnetic field originates from electronic device 100 and relates to digital content stored in the electronic device 100. In an embodiment, the magnetic field originates from a remote source. In an embodiment, the perceivable stimulus is related to the magnetic field. Further, in an embodiment, the perceivable stimulus relates to digital content of the remote source and/or the electronic device 100. In an embodiment, the digital content is at least one of a user operation, telecommunications message and communications indication.

FIG. 2a is a diagram of an apparatus 5 attached to a user's arm according to an example embodiment of the invention. FIG. 2b is a diagram of the apparatus 10 attached to a user's abdominal area according to an example embodiment of the invention. FIG. 2c is a diagram of the apparatus 15 attached to a user's fingernail according to an example embodiment of the invention.

In an embodiment, an apparatus such as apparatus 5, 10 and 15 comprises a material such as a magnetic material attachable to skin, the material capable of detecting a magnetic field and transferring a perceivable stimulus to the skin, wherein the perceivable stimulus relates to the magnetic field. In an embodiment, the skin is human skin. In an embodiment, the material is a ferromagnetic material. In an embodiment, the perceivable stimulus comprises vibration. In embodiment, perceivable stimulus relates to a time variation of at least one of a magnetic field pulse, height, width and period.

In an embodiment, the material comprises at least one of a visible image, invisible image, invisible tattoo, visible tattoo, visible marking, invisible marking, visible marker, invisible marking, visible sign, invisible sign, visible label, invisible label, visible symbol, invisible symbol, visible badge and invisible badge. In an embodiment, the material comprises ferromagnetic powder.

Magnetic materials may be used to advance communication with an electronic device and a user. Magnetic materials, for example materials may comprise a magnetic compound for example iron, a ferromagnetic powder configured to detect a magnetic field. The ferromagnetic material may be configured to transfer a perceivable stimulus in accordance to the detected magnetic field. A material may be used for creating an image on a surface, for example on skin. The material, attachable to skin, may be an image, a tattoo, a marking, a marker, a sign, a label, a symbol, a badge or any alike visible or invisible symbol. The material may react when a magnetic field, for example an alternating magnetic or static magnetic field is in the proximity of the image. The reaction may be causing or transferring a perceivable stimulus. The perceivable stimulus may comprise vibration, a vibration on the image on a user's skin, for example. The user may perceive the vibration. The vibration of the image may cause vibrating the user's skin simultaneously. The reaction may be due to opposing magnetic forces between the electronic device and the image.

According to an example embodiment of the invention a material such as a magnetic material is configured to detect a magnetic field when the magnetic material is in range of a magnetic field. A user with an image of a material on his/her skin may touch or nearly touch a surface of an electronic device or put his or her finger in proximity of an electronic device, and the opposing forces of magnetic field between the electronic device and the image may cause the image to vibrate therefore transferring the vibration or vibrating the user's skin. In an embodiment, an impulse is given to the image providing a perceivable impulse on user's skin.

Figure 3:
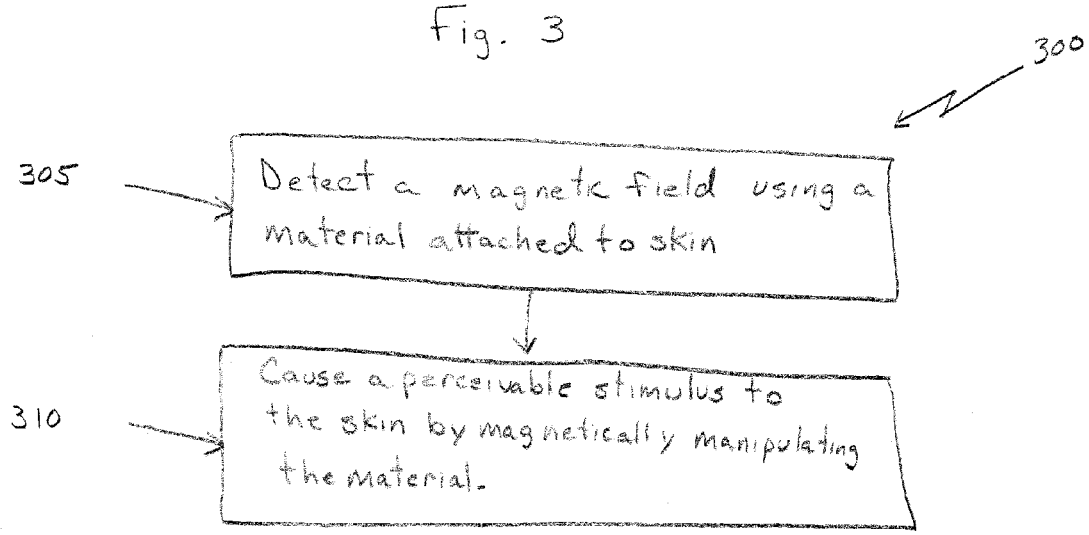
FIG. 3 is flow diagram of a method according to an example embodiment of the invention.

FIG. 3 is a flow diagram of a method 300 according to an example embodiment of the invention. At 305, a magnetic field is detected using a material attached to skin. The magnetic field may be initiated or generated by a source, which may be separate, remote, nearby or adjacent to the apparatus configured to detect the magnetic field. The source of the magnetic field may be an electronic device such as electronic device 100 of FIG. 1. The magnetic field may be caused by a remote source, e.g. an electronic device 100. The detected magnetic field may be opposing to the magnetic field induced in the material. In an embodiment, the skin is human skin. In another embodiment, the skin is animal skin.

At 310, a perceivable stimulus to the skin is caused by magnetically manipulating the material. The perceivable stimulus may be any stimulus including but not limited to a vibration and/or impulse movement of the skin. The detected magnetic field is configured to cause a perceivable stimulus to the material when the material is within a range of the external magnetic field. The material may be attachable to a user, and pass the perceivable stimulus to the user. In an embodiment, the material is a ferromagnetic material. In an embodiment, the perceivable stimulus relates to digital content of an electronic device.

In an embodiment, the material is attached to skin using at least one of stamping a ferromagnetic pattern, spraying the ferromagnetic pattern, attaching adhesive tape comprising the ferromagnetic pattern, apply a decal comprising the ferromagnetic pattern, tattooing the ferromagnetic pattern and drawing the ferromagnetic pattern. In some embodiments, the material is apparatus 5, 10, and/or 15 of FIGS. 2a, 2b, and 2c, respectively.

Figure 4:
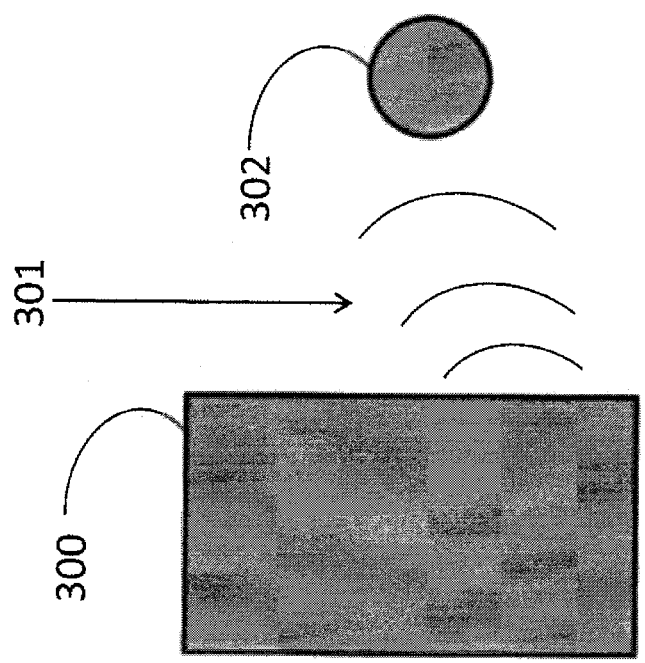
FIG. 4 is a diagram of an electronic device and an apparatus according to an example embodiment of the invention.
Figure 5:
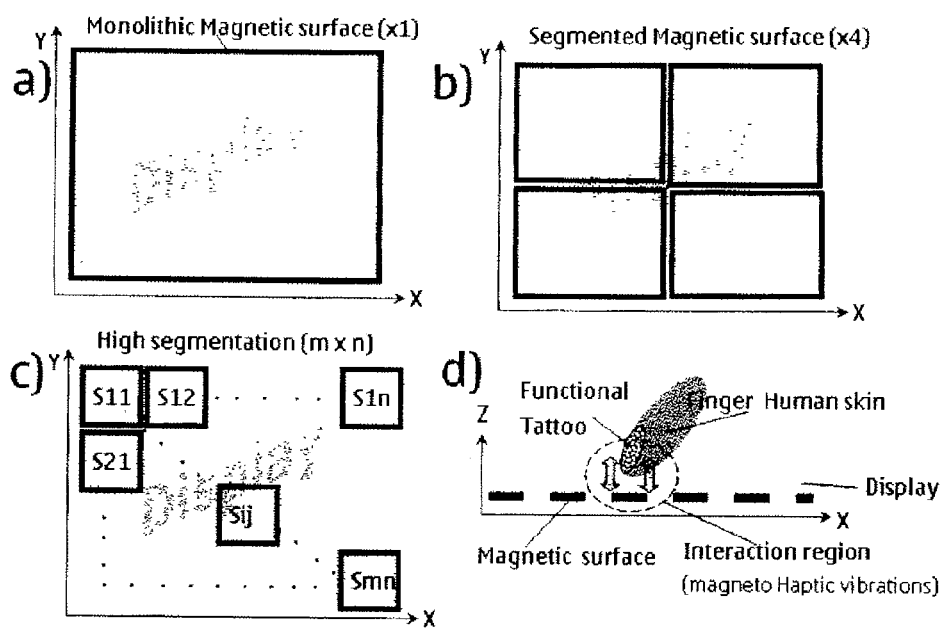
FIGS. 5a, 5b, 5c and 5d are examples of an electronic device surface with electromagnetic coils according to an example embodiment of the invention.

FIG. 4 is a diagram of an electronic device 300 and an apparatus 302 according to an example embodiment of the invention. In an embodiment, electronic device 300 is electronic device 100 of FIG. 1.

In an embodiment, electronic device 300 is configured to induce a magnetic field 301. The magnetic field 301 may be constant over certain period of time, or it may vary. The magnetic field may be controlled by the electronic device 300 or other devices at least partly participating in causing the magnetic field 301.

In an embodiment, apparatus 302 is at least one of apparatus 5 of FIG. 2a, apparatus 10 of FIG. 2b and apparatus 15 of FIG. 2c. The apparatus 302 may detect the magnetic field 301 when it is located at the range of the magnetic field 301. Detection of the magnetic field 301 may cause certain predetermined stimulus at the apparatus 302. The apparatus 302 may sense proximity of the magnetic field 301. The magnetic field 301 may cause a visual and/or other perceivable indication at the apparatus 302. The perceivable indication may then be perceived by the user via e.g. visual and/or haptic senses. A haptic stimulus or vibration may be provided to user via the apparatus 302.

According to an example embodiment of the invention, magnetic field 301 may correspond to certain digital content of the electronic device 300. The magnetic field may vary according to digital content of the inducing or sending electronic device 300. Different magnetic fields may induce different perceivable stimulus when detected by the apparatus 302. A magnetic field may be an alternating magnetic field between the electronic device 300 and the apparatus 302, for example. The digital content may be for example but not limited to a launch of an application in the electronic device 300, an alert of an incoming message, a phone call, an alarm, an alert of a body part in proximity of the apparatus. The perceivable stimulus may depend on characteristics of the detected magnetic field. The perceivable stimulus may depend on time variation in at least one of magnetic field pulse height, width and period, for example. The perceivable stimulus may correspond to the detected magnetic field, e.g. certain magnetic field may cause certain kind of perceivable stimulus in the apparatus. The perceivable stimulus of the apparatus may comprise at least one of different vibration frequencies and intensities and sequences of localized magnetic vibrations for distinguishing an associated digital content. A user may specify and personalize what type of vibration certain application or a message from a certain person causes. The magnetic field to be induced may be application specific, characteristics specific, feature specific or sender specific, for example. This specification and personalization may happen in the electronic device settings which the user can modify according to his or her preferences.

A user of an electronic device may specify in settings of the device that when caller is defined to be "Bob" in accordance to the phone book of the mobile device, a magnetic field 301 is induced by the electronic device in addition to the ring tone and other possible alert, like visual. The magnetic field 301 may be defined to be certain for an identified caller group. According to an example, activation of a certain character, feature of application in a mobile phone, may cause magnetic field. Examples of characters, features or applications may be low battery indication, received message, received call, calendar alert, change of profile, e.g. based on timing, change of time zone, or any other. In accordance to an example embodiment, the user may further specify characteristics of the magnetic field. The electronic device may include options for different kind of haptic feedbacks, among which the user may choose to personalize the device. The magnetic field, when detected by the apparatus, will cause a different effect based on its characteristics. For example, the magnetic field may cause vibration of one short pulse, multiple short pulses, few long pulses, mixture of short and long pulses, strong pulses, weak pulses, and so on. Timing between pulses and/or length of pulses and/or strength of pulses may differ and thus cause different perceivable effect via apparatus 302 in response to detecting the magnetic field. According to an example embodiment, the phone menu may comprise set of magnetic field options, which may comprise magnetic fields of different kinds. Different kinds of magnetic fields may comprise different combinations of pulse width, height and/or timing. Different magnetic fields may provide different kind of perceivable stimulus and/or indications and/or effects.

According to an example embodiment of the invention, the apparatus 302 comprises a ferromagnetic powder. According to an example embodiment of the invention, apparatus 302 is ink enriched by ferromagnetic or paramagnetic compounds for example but not limited to iron (Fe), iron oxide (Fe2O3), magnetite, liquid suspensions of the rare-earth materials for example neodymium (Nd). According to an example embodiment of the invention, when ferromagnetic materials are used for the image, the magnetization of the image may be applied also afterwards.

Prior to using the ferromagnetic inks for creating the apparatus 302 attachable to human skin, the ink material may be exposed to elevated temperatures to cause demagnetization. Such demagnetized ink is then used for creating an image by for example dispersing the ink material on or under the skin to make a functional, tattoo like image. Once the apparatus is settled and the skin cured, the user with the functional image may use permanent magnet to magnetize the functional image on the skin again. For example, the user may bring the tattoed area in proximity of an external magnet and go several times over this magnet to magnetize the image material again. Such magnetized image may have enhanced sensitivity towards external alternating magnetic fields.

The source of alternating magnetic field may be provided by simple magnetic coil such as coil 44 of the electronic device 100 of FIG. 1. According to an example embodiment, an electronic device 300 comprises a magnetic surface which may comprise an array of individually operated magnetic coils. Each coil may be controlled by applied stimulating signals configured to determine the stimulating pattern which at the end determines what kind of stimulation the user perceives on the skin when being in the proximity to the magnetic surface.

For example a controller may be realized to enable controlled time variation of the stimulating signals for each magnetic coil. For example stimulating signals may present a series of regular top-hat shaped pulses separated by regular periods T. Each pulse may be characterized by a height H and a width W. A train of pulses may be characterized by {H, W, T}. The controller may for example control the time variation in the stimulating signal potential difference by controlling one or more of H, W, T. The train of pulses may then be characterized by {H(t), W(t), T(t)}, where H(t) indicates time variation of the pulse height, W(t) indicates time variation of the pulse width and T(t) indicates time variation of the pulse period.

According to an example embodiment of the invention, when paramagnetic materials are being used for the apparatus, no remaining magnetization is left in the image. The image made of paramagnetic ink may work in external magnetic field, however, after the external magnetic field has been removed, there is no permanent magnetization on the paramagnetic image. This way even persons who are very sensitive to external electro-magnetic fields, for example persons with medical implants, may utilize at least some embodiments. There will be insignificant or no influence on their internal electronic implants and insignificant or no interference with the image. Since no permanent magnetization is left on the image, this might create a safety factor also for users who might be sensitive for example to nickel or other magnetic materials.

According to an example embodiment of the invention, an electronic device is configured to send an initial signal and the initial signal is configured to magnetize the apparatus, e.g. on the users image. According to a response from the apparatus which may be an acknowledgement of a secure connection, information may be shown to the user from the electronic device. In some embodiments the magnetic images may take form factors and shapes with specific magnetic impedance. The image shape and magnetization pattern may be used for storing additional information for example but not limited to names, numbers, hidden identification which may serve as a for example password when the mobile device or other magnetizing source is brought into proximity to the functional image.

According to an example embodiment, a content displayed on the electronic device display may be shown to the electronic device's owner after the correct owner is recognized via ferromagnetic image. According to another example embodiment the electronic device may be operated only when being held at least substantially close by the electronic device's recognized owner. The automatic security applications may operate by being in a defined proximity to an electronic device. For example a lap top screen may show a content on the display only when the user is in a determined proximity.

According to an example embodiment of the invention, the image may have a simple shape and structure, for example but not limited to circle, segmented ring, triangle, square. The image may have more complex geometries for example but not limited to a spiral, a labyrinth shape. The image can be realized in different geometrical shapes and in a pre-determined way to realize and match certain magnetic impedance, for example Z. The specific impedance Z may be used for automatic security applications for example frequently used proximity based magnetic passwords.

FIGS. 5a, 5b, 5c and 5d are examples of an electronic device surface with electromagnetic coils according to an example embodiment of the invention. FIG. 5a describes an example embodiment, in which a single electromagnetic coil or plurality of electromagnetic coils comprise a monolithic surface on a display configured to generate a uniform magnetic surface. The magnetic surface may be detected by a ferromagnetic material. If a ferromagnetic image is brought into proximity of the magnetic surface, a stimulus corresponding to the magnetic field induced by the magnetic surface of FIG. 5a may be provided by the ferromagnetic image.

FIG. 5b describes an example embodiment, in which a single electromagnetic coil or plurality of electromagnetic coils comprise four segmentic magnetic surfaces. The number of segmentic magnetic surfaces may be four or any number according to this example embodiment. Some or all of the magnetic surfaces may produce different magnetic fields, thereby causing different stimulus in a ferromagnetic image, when the ferromagnetic image is brought in the proximity or range of certain magnetic field. The magnetic fields of different segmented magnetic surfaces may be provided at different times.

FIG. 5c describes an example embodiment, in which a single electromagnetic coil or plurality of electromagnetic coils such as coil 44 of electronic device 100 of FIG. 1 comprise a number of high segmented areas on an electronic device display, referring to the elements from S1n to Snm__ in the FIG. 5c. The segmented areas may be used to provide different magnetic fields, which may cause different stimulus in an apparatus such as apparatus 302 of FIG. 4. User sensing the ferromagnetic image may receive different perceivable stimulus via the ferromagnetic depending on the segmented area, where the magnetic field originated. Different segmented areas may be configured to output to the user different, distinguishable functions or features remotely via haptic stimulus.

FIG. 5d describes an example embodiment of the invention in which a magnetic surface is created on a display such as display 28 of FIG. 1. Said magnetic surface may create an interaction area. In FIG. 5d a human finger is brought at the interaction area, or range of the magnetic surface. The human finger has an image of ferromagnetic material on the human finger or alternatively an image of ferromagnetic material printed on a nail surface. According to an example embodiment, when the human finger comes in to the interaction area, a vibration may be caused in the image on the human. An image may be magnetized by appropriately stimulating individual magnetic coils at the magnetic surface. For example only certain coils which physically form a circle may be stimulated at a time. According to an example embodiment, when user slides his or her finger above such coils he or she may feel vibrations at a tip of a fingertip area only for example when the user is in the proximity to the activated coils only. By this way programmable magnetic image explored by the user finger and functional image therein, can be formed.

Without in any way limiting the scope, interpretation, or application of the claims appearing below, a technical effect of one or more of the example embodiments disclosed herein is stimulating human skin remotely or without a physical contact. Another technical effect of one or more example embodiments is to provide haptic connection. Another technical effect of one or more example embodiments is tactile information delivery directly to the user body or skin. Another technical effect of one or more of the example embodiments disclosed herein is to provide silent communication between an electronic device and a user. Another technical effect of one or more of the example embodiments is to provide a new communication language based on wireless haptics, for example but not limited to set of pulses, frequencies, way of stimuli. Another technical effect of one or more of the example embodiments is to provide potential for security applications and passwords which might be required in interaction with different electronic communication devices for example but not limited to lap tops, desk tops, mobile phones, gaming devices, personal digital assistants, internet tablets. Another technical effect of one or more of the example embodiments disclosed here in is that the invention is configured to provide extended human skin sensitivity to external magnetic fields. Another technical effect of one or more of the embodiments disclosed herein is that the invention can directly sensitize human skin against external magnetic fields without involving mechanical moving parts, for example but not limited to actuators, for purpose of tactile perceptions.

Embodiments of the present invention may be at least partly implemented in software, hardware, application logic or a combination of software, hardware and application logic. According to some or all embodiments a computer program product comprises a computer-readable medium bearing computer program code embodied therein for use with a computer, the computer program code comprising code for providing a magnetic field comprising certain characteristics; wherein the magnetic field is detectable by an apparatus such as apparatus 302 of FIG. 4

The software, application logic and/or hardware may reside on a mobile device, its memory or a remote location accessible to the mobile device. If desired, part of the software, application logic and/or hardware may reside on a mobile device, and part of the software, application logic and/or hardware may reside on a remote location. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with an example of a computer described and depicted in FIG. 1. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus comprising:
a ferromagnetic material attachable to skin, the material capable of detecting a magnetic field and transferring a perceivable stimulus to the skin,
wherein the perceivable stimulus relates to the magnetic field and comprises a vibration;
wherein the material comprises at least one of a visible image, invisible image, invisible tattoo, visible tattoo, visible marking, invisible marking, visible marker, visible sign, invisible sign, visible label, invisible label, visible symbol, invisible symbol, visible badge, and invisible badge; and
wherein the magnetic field originates from an electronic device and relates to digital content stored in the electronic device; and
wherein the perceivable stimulus relates to a time variation of at least one of a magnetic field pulse, height, width, and period.

2. An apparatus according to claim 1, wherein the perceivable stimulus is caused by a magnetic manipulation of the material attachable to skin.

3. An apparatus according to claim 1, wherein the magnetic field originates from a remote source.

4. An apparatus according to claim 3, wherein the perceivable stimulus relates to digital content of the remote source.

5. An apparatus according to claim 4, wherein the digital content is at least one of a user operation, telecommunications message and communications indication.

6. An apparatus according to claim 1, where the material comprises ferromagnetic powder.

7. An apparatus according to claim 1, wherein the skin is human skin.

8. A. method comprising:
detecting a magnetic field using a ferromagnetic material attached to human skin; and
causing a perceivable stimulus to the skin by magnetically manipulating the material;
wherein the material is ink attached to skin using at least one of stamping a ferromagnetic pattern, spraying the ferromagnetic pattern, attaching adhesive tape comprising the ferromagnetic pattern, .applying a decal comprising the ferromagnetic pattern, tattooing the ferromagnetic pattern, and drawing the ferromagnetic pattern; and
wherein the perceivable stimulus relates to digital content of an electronic device.

9. A method according to claim 8, wherein the perceivable stimulus further relates to the magnetic field and comprises a vibration.

10. A method according to claim 8, wherein the perceivable stimulus further relates to a time variation of at least one of a magnetic field pulse, height, width, and period.

11. A method according to claim 8, wherein the magnetic field originates from a remote source.

12. A method according to claim 11, wherein the perceivable stimulus relates to digital content of the remote source.

13. A method according to claim 12, wherein the digital content of the remote- source is at least one of a user operation, telecommunications message, and communications indication.

14. A method according to claim 8, wherein the ink comprises ferromagnetic powder.

15. A. method according to claim 8, wherein at least one characteristic of the magnetic field is controllable by the electronic device.

16. A method according to claim 8, wherein at least one characteristic of the magnetic field is related to digital content of the electronic device, digital content of the electronic device comprising at least one of an indication of an alert of a message, indication of an incoming call, indication of a body part in proximity of the electronic device, indication of information displayed on the electronic device, indication of a launch of an application, and indication of at least a portion of a displayed image.

17. A method according to claim 8, further comprising generating the magnetic field using at least one electromagnetic coil.

* * * * *

UNITED STATES PATENT AND TRADEMARK OFFICE
CERTIFICATE OF CORRECTION

| | | |
|---|---|---|
| PATENT NO. | : 8,766,784 B2 | Page 1 of 1 |
| APPLICATION NO. | : 13/231697 | |
| DATED | : July 1, 2014 | |
| INVENTOR(S) | : Radivojevic et al. | |

It is certified that error appears in the above-identified patent and that said Letters Patent is hereby corrected as shown below:

In the Claims:

Claim 8, col. 9, line 34 "A." should be deleted and --A-- should be inserted.

Claim 9, col. 10, line 1 ".applying" should be deleted and --applying-- should be inserted.

Signed and Sealed this
Thirtieth Day of September, 2014

Michelle K. Lee
*Deputy Director of the United States Patent and Trademark Office*